United States Patent [19]

Matsuoka

[11] Patent Number: 5,544,057
[45] Date of Patent: Aug. 6, 1996

[54] LOAD SETTING DEVICE FOR RAILWAY CARS

[75] Inventor: Toshiyuki Matsuoka, Shijimi-cho, Japan

[73] Assignee: Nabco Ltd., Kobe, Japan

[21] Appl. No.: 552,441

[22] Filed: Nov. 3, 1995

Related U.S. Application Data

[63] Continuation of Ser. No. 192,925, Feb. 7, 1994, abandoned.

[30] Foreign Application Priority Data

Feb. 8, 1993 [JP] Japan ................................. 5-044639

[51] Int. Cl.⁶ ............................................................. B61B 1/00
[52] U.S. Cl. ............................ 364/426.05; 364/426.03
[58] Field of Search ........................ 364/426.05, 426.03; 318/52; 303/3, 20, 100

[56] References Cited

U.S. PATENT DOCUMENTS

| 3,944,292 | 8/1973 | Doi et al. ........................... | 303/24 C |
|---|---|---|---|
| 4,147,238 | 4/1979 | Ames et al. ........................ | 188/57 |
| 4,402,047 | 8/1983 | Newton et al. .................... | 364/426 |
| 4,414,630 | 11/1983 | Harris et al. ..................... | 364/426 |
| 4,677,557 | 6/1987 | Stumpe ............................. | 364/426 |
| 4,818,035 | 4/1989 | McNinch, Jr. ..................... | 303/7 |
| 4,896,090 | 1/1990 | Balch et al. ...................... | 318/52 |
| 5,039,174 | 8/1991 | Beacon et al. .................... | 303/22.7 |
| 5,215,154 | 6/1993 | Kirby ................................ | 177/136 |
| 5,249,851 | 10/1993 | Johnsen ............................ | 303/104 |
| 5,280,223 | 1/1994 | Grabowski et al. ............... | 318/139 |

*Primary Examiner*—Kevin J. Teska
*Assistant Examiner*—Stephen J. Walder, Jr.
*Attorney, Agent, or Firm*—James Ray & Associates; J. Sotak

[57] ABSTRACT

Disclosed is a load-setting device for railway cars which is installed on each such railway car and which sends an output to at least one of a power-running control unit and a brake control unit. The output is sent in the form of a load signal corresponding to an actual load applied on such railway car. The device comprises a preset-value generator which sets an initially preset pseudo-load signal corresponding to such railway car; a load-calculation circuit; and a load signal generator. The load calculation circuit is connected to receive the pseudo-load signal, at least one of power-running command and braking command as determined by acceleration-deceleration signals, an actual acceleration and deceleration signal on the basis of a railway car speed signal, and a slip-sliding detection signal. The load-calculation circuit modifies the pseudo-load signal in response to such at least one of such power running command and such brake command and such acceleration and deceleration signal. When such slip-sliding detection signal is input to the load-calculation circuit, the load-calculation circuit further modifies the pseudo-load signal in response to such slip-sliding detection signal and produces on its output an initial load signal. The load-signal generator stores the initial load signal and communicates same as an actual load signal. The actual load signal is usable by such at least one of such brake control unit and such power-running control unit to improve riding characteristics of such railway car.

12 Claims, 4 Drawing Sheets

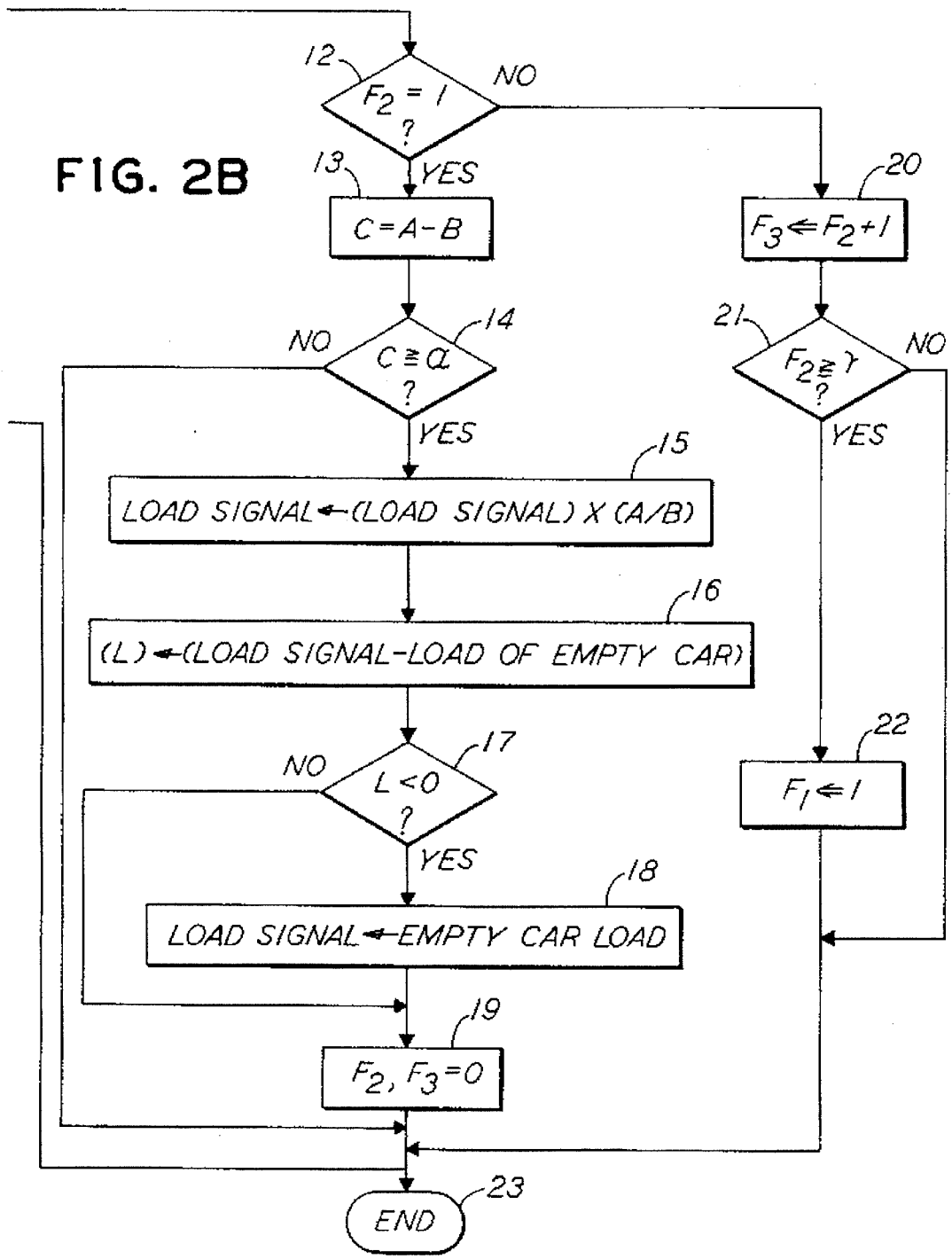

LOAD SETTING DEVICE FOR RAILWAY CARS

This is a continuation, of application Ser. No. 08/192,925, filed Feb. 7, 1994 now abandoned.

FIELD OF THE INVENTION

The present invention relates, in general, to a railway braking system in which a load-compensation means is incorporated therein and, more particularly, this invention relates to a new load-setting device for generating a power-running command and a braking command in accordance with actual load weight exerted on such railway car.

BACKGROUND OF THE INVENTION

One certain type of conventional prior art load-setting system that is represented by load-compensation mechanisms is described in "100-type Railroad Brakes for New Speedy Railroad Cars of Tobutetsudo Railroad", pp. 22–29, Nabuko Technical Report No. 71, issued Jan. 1, 1991.

It should be particularly noted here that a block diagram of a brake system such as is presently being used in a generally known load-compensation device is illustrated in FIG. 3. The explanation to follow first considers a brake system designed to employ such known load-compensation device.

This brake system makes simultaneous use of both electric brakes, namely (regenerative brakes), and pneumatic brakes. Such known brake system is operated in such a manner that should an electric brake force which is developed under the effect of a braking command electrical signal value be insufficient, the system will then compensate for such brake force insufficiency by applying a supplemental pneumatic brake force.

As illustrated in FIG. 3, the brake command electrical signal value is supplied to a brake control unit 20 through a brake command communication line 10b. The brake control unit 20 calculates a brake command signal and a load command signal from a load compensation device 24 and communicates a regenerative brake command electrical signal to a power-running unit 21. This action results in a regenerative braking force being developed by a main circuit motor 34 disposed on such railway car.

Thus, a regenerative brake equivalence electrical signal can be developed by the above-mentioned regenerative brake from the power-running unit 21 which, according to this known brake system, calculates the compensation pneumatic braking force required and communicates an electrical pneumatic brake signal to a brake control device 22.

The electrical pneumatic brake signal is then converted by the brake control device 22 into a pneumatic pressure which is communicated to a brake cylinder 37. As is known in the railway car braking art, brake cylinder 37 applies a compensation braking force to the wheels of such railway car.

Furthermore, a power-running command electrical signal is applied to a power-running control unit 21 by a power-running command electrical signal communication line 10a. The power-running control unit 21 calculates the above-mentioned power-running command electrical signal and the load electrical signal 16 which is received from the load-compensation unit 24 through the brake control unit 20 and transmits the power-running electrical signal to the main circuit motor 34 which accelerates such railway car.

In FIG. 3, reference numeral 23 designates a slippage prevention device while reference numeral 6 designates a slippage detection controller. Reference numeral 9 identifies a speed-sensor device.

The description to follow primarily concerns the load-compensation device 24 and a load-detection device 46. A pneumatic spring 26 disposed on such railway car senses weight of the passengers and/or freight being transported on such railway car. The pneumatic spring 26 compresses in proportion to the weight and such railway car lowers toward the platform 42.

The lowering of the railcar body 43 is detected in this system by a control valve device 25. The control valve device 25 is also equipped to detect the vertical position of such railroad car body 43. An air inlet port of the control valve device 25 is for returning the railcar body 43 to its normal or initial position. Opening of the air inlet port of control valve device 25 permits a pressure buildup in the pneumatic spring 26 which results in such railcar body 43 returning to its initial position. At this point, the magnitude of increase in the pneumatic pressure present in the pneumatic spring 26 is substantially proportional to the load weight of the passengers or freight carried by such railroad car.

The pneumatic pressure within the pneumatic spring 26 is detected, in this prior art brake system, by a pneumo-electric converter (not shown) and is converted therein into an electrical signal value. This electrical signal value is amplified by an amplifier (not shown). The resulting amplified electrical signal is communicated to the load-compensation unit 24 and along with other electrical signals representative of various additional functions such as empty-car verification is communicated to the brake control unit 20 as the load electrical signal 16.

A problem arises with this prior art brake system, however, when such railway car is not equipped with the pneumatic spring 26. In this event, the load compensation device 24 and the load detection device 46 cannot detect pneumatic pressure. Furthermore, even if the pneumatic spring 26 is used, on such railway cars in which pneumatic pressure within the pneumatic spring 26 is utilized to perform another purpose, the pneumatic spring 26 pressure will not necessarily be proportional to the weight of the passengers and/or freight. The pneumatic spring 26 may, for example, be utilized to control the side to side tilting of such railway car which is equipped with a pendulum-type support structure. In this case, the pneumatic spring 26 ensures positive tilt of such railway car body 43 towards the inner side as a means of reducing centrifugal force being exerted as such railway car is propelled at a high speed along a curved portion of a track.

Under these circumstances, when air pressure present in the pneumatic spring 26 becomes substantially non-proportional to the weight of the passengers, the load electrical signal therefore does not accurately represent the weight of the passengers. In this case such railway car is constructed in a manner such that the required speed of acceleration and/or deceleration of such railway car is constant and does not depend on a certain amount or weight of passengers. The power-running command electrical signal communicated by a train operator and the brake command electrical signal are therefore affected by the weight of such railcar body 43 and such railway car accelerates or decelerates in response to the train operator's commands.

As this does not accurately reflect the actual load conditions, however, it is extremely difficult for the train operator to control acceleration and deceleration of such railway car. Consequently, this prior art control system requires the train operator to be extremely versatile and highly skilled in train operation techniques.

SUMMARY OF THE INVENTION

The present invention provides a load-setting device for railway cars which is preferably installed on each such railway car. The load-setting device transmits an output signal to at least one of a power-running control unit and to a brake control unit. The output signal is communicated in the form of a load signal which is representative of actual load being exerted on such railway car. The load-setting device includes a preset-value generator means which communicates a pseudo-load weight signal representative of an initial load weight of such railway car. The load-setting device also includes a load-calculation circuit means for generating and communicating a load weight signal. The load-calculation circuit means includes a load-calculation unit. The load-calculation unit is connected to receive at a fourth input thereto the pseudo-load weight signal from the preset-value generator means. The load-calculation unit is also connected to receive at a first input thereto a brake command electrical signal from a brake command communication line. The load-calculation unit is further connected to receive at a second input thereto an electrical signal representative of both acceleration and deceleration of such railway car and connected to receive at a third input thereto an electrical signal representative of a slip-sliding condition. The load-calculation circuit also includes an empty car verification circuit for generating and communicating an electrical signal representative of a weight of such railway car when empty. The load-calculation circuit further includes a high-ranking priority unit which has a first input connected to receive a load weight electrical signal output from the load-calculation unit and a second input connected to receive the empty weight railway car electrical signal from the empty car verification circuit. The high-ranking priority unit compares the load weight electrical signal with the empty weight railway car electrical signal and communicates as an output one of the load weight and the empty weight electrical signals as the load weight electrical signal. This ensures that the load weight electrical signal represents a weight of such railway car that generally exceeds such weight of such railway car when empty. The load-setting device additionally includes a load-signal generator means connected to receive the load weight electrical signal from the high-ranking priority unit. The load-calculation unit modifies the pseudo-load weight signal in response to the electrical signals received at the first, second and third inputs thereto and generates therefrom for output to the high-ranking priority unit the load weight electrical signal which more accurately represents such load exerted on such railway car. The load signal generator means communicates the load weight electrical signal received from the high-ranking priority unit as the actual load weight electrical signal which is usable by such at least one of such brake control unit and such power-running control unit to improve riding characteristics of such railway car.

OBJECTS OF THE INVENTION

It is, therefore, one of the primary objects of the present invention to provide a load-setting device for a railway car which substantially eliminates the problems associated with prior art railway car control systems.

Another object of the present invention is to provide an arrangement of a load-setting device for utilization on a railway car which can be readily and easily adjusted for the actual load conditions on such railway car without requiring the use of pressure ill the pneumatic springs.

In addition to the objects and advantages of the present invention that have been described above, various other objects and advantages of the load-setting device for railway cars will become much more readily apparent to those persons who are skilled in the relevant railroad control systems art from the following more detailed description of the invention, particularly, when such detailed description is taken in conjunction with the attached drawings and with the appended claims.

Figure 1:
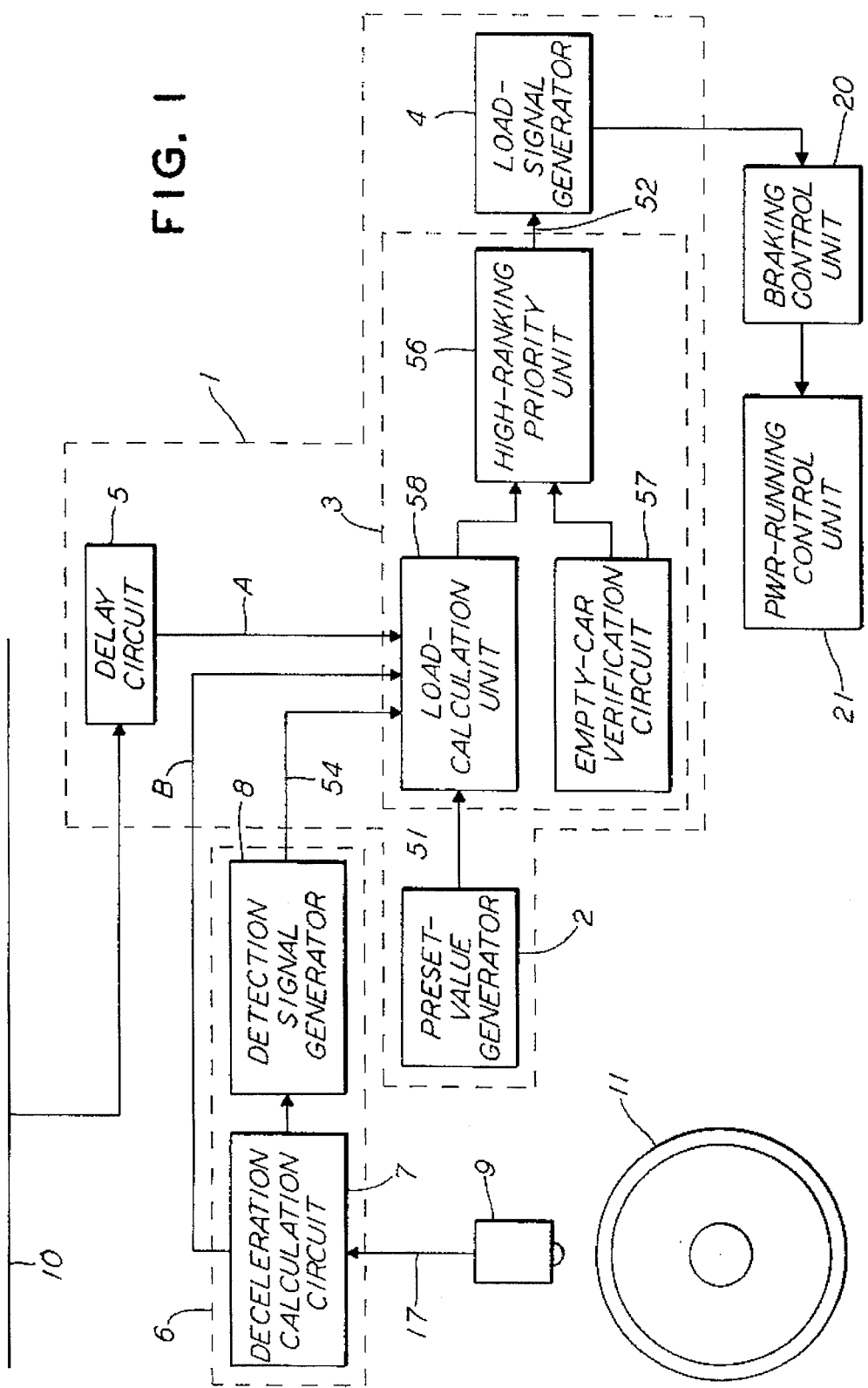
FIG. 1 is a block diagram which schematically illustrates the structure of the load setting device, produced according to a presently preferred embodiment of the invention, for use with a railway car.

DESCRIPTION OF THE PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components of the load-setting device for railway cars, which have identical functions, have been identified with identical reference numerals throughout each of the several Figures illustrated herein.

Figure 3:
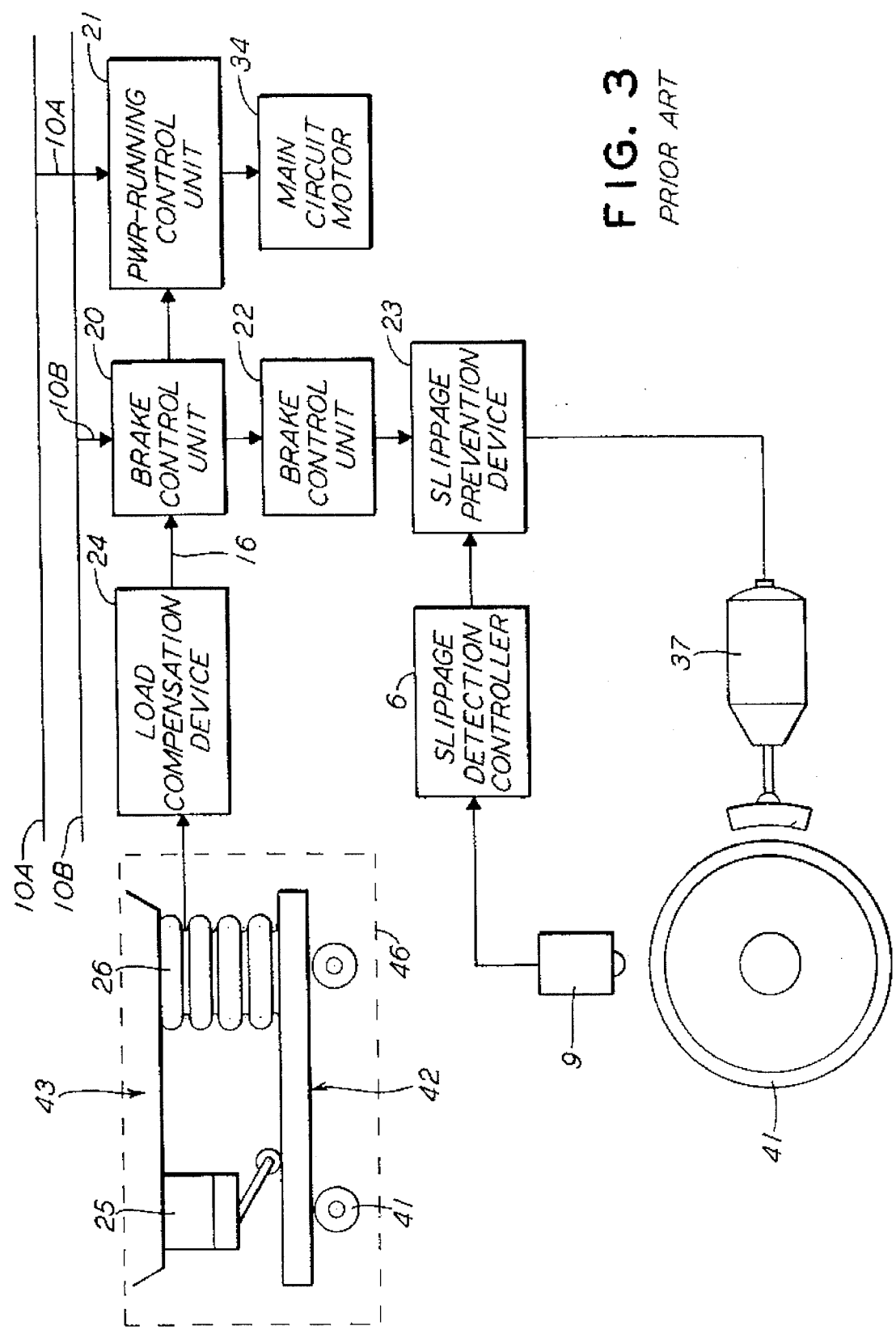
FIG. 3 is a block diagram which schematically illustrates a brake system equipped with a conventional prior art type load compensation device.

The present invention will now be further described by way of a practical example and with particular reference being made to the accompanying Figures. However, the description of those component parts, which are common to the above described prior art load-compensation mechanism illustrated in FIG. 3 and identical to the component parts of the present system of FIG. 1, will be omitted.

Now, with respect to the construction of a presently preferred embodiment of the load-setting device of the present invention particular reference is directed to FIG. 1. The invented load-setting device, generally designated 1, includes the preset-value generator means 2, the load-calculation circuit means 3, the load-signal generator means 4 and a delay circuit 5.

The preset-value generator 2 presets the load conditions for such railway car. The above-mentioned load conditions are produced as an output from the preset-value generator 2 in the form of a pseudo-load electrical signal 51.

The load-calculation circuit 3 includes a load-calculation unit 58, an empty-car verification circuit 57, and a high-ranking priority unit 56. The load-calculation unit 58 receives the pseudo-load electrical signal 51 and at least one of a power-running command signal and brake command signal A through the delay circuit 5 from a power running command and/or brake command line 10, which transmits commands sent by the driver.

Furthermore, the load-calculation unit 58 receives a slip-sliding detection signal 54 and an acceleration and deceleration signal B from a slip-sliding detection controller 6.

The acceleration and deceleration signal B is obtained by converting, through use of an acceleration/deceleration-calculation circuit 7 of a slip-sliding detection controller 6, a railway car speed signal 17 into an acceleration or deceleration value. Such speed signal 17 is detected by means of speed sensor 9 which detects the speed of rotation of a railcar wheel 41.

As a railway car usually has four axles, it is understood that such acceleration/deceleration-calculation circuit 7 receives such speed signal 17 from such speed-sensors 9 of all four axles. However, only the speed which is the nearest to the actual speed of the car is received and used. For example, the signal with the most delayed speed will be taken during power-running and the signal of highest speed will be taken during braking as the speed which is nearest to the actual speed of such railway car.

On the other hand, such slip-sliding detection signal 54 is an output signal which is produced by a detection signal generator 8 of such slip-sliding detection controller 6 during the detection of slipping and sliding from such acceleration and deceleration speed signal of each railway car. Load-calculation unit 58 receives the above mentioned signal as an input and compares such at least one of such power-running command signal and such brake command signal A with acceleration and deceleration signal B, which represents the actual acceleration or deceleration.

On the basis of the above comparison, the load-calculation unit 58 increases or decreases the pseudo-load signal 51, and when such slip-sliding detection signal 54 is input, this action decreases the pseudo-load signal 51 by a predetermined amount. Notwithstanding the empty car verification circuit 57 and the high-ranking priority unit 56 which are discussed in greater detail later herein, the pseudo-load signal 51 as modified is sent to load-signal generator 4 as an initial load signal 52. Load-signal generator 4 memorizes the load condition of the initial load signal 52 and sends it to at least one of such braking control unit 20 and such power-running control unit 21 as a load signal 16 to improve riding characteristics of such railway car. Such brake control unit 20 and/or such power-running control unit 21 basically use the load signal 16 to generate a power-running command and a braking command representative of actual load weight exerted on such railway car.

It is also possible for other railroad car speed detection means to be used instead of the above-described speed sensor 9. For example, a freely-rotating wheel (which does not receive either braking or running power) may be installed on a front car and may be used for sending speed signals.

The following description relates to delay circuit 5 in the case where such at least one of such power-running command and such braking command signal A from a train operator is compared directly with such acceleration and deceleration signal B which is calculated from the output of speed sensor 9. Because of the delayed response to such acceleration and deceleration signal B, it would be impossible to carry out such a comparison until signals are stabilized and/or otherwise matched in time. This is achieved with the use of delay circuit 5.

Delay circuit 5 may utilize simulation circuits, but in the event that load calculation circuit 3 uses software, such simulation circuits become unnecessary. In other words, delay circuit 5 delays at least one of such power running and braking command signals in time and outputs same as command signal A to load calculation circuit 3, matched in time with at least such acceleration and deceleration command B.

Figure 2A:
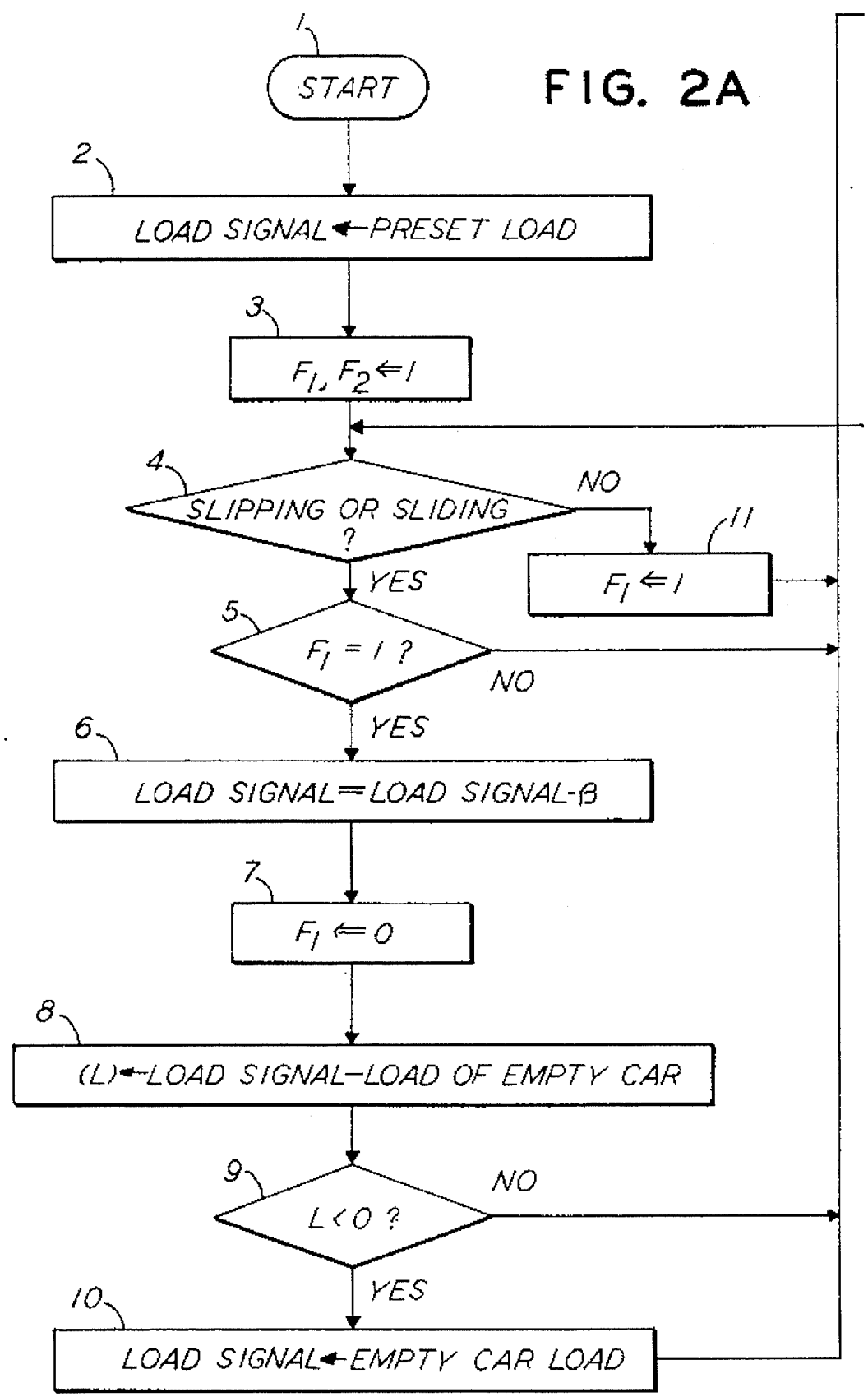
FIG. 2 is a flow chart which illustrates the operation of the load setting device illustrated in FIG. 1.

The following description concerns a flow chart which is shown in FIG. 2, and which illustrates the content of a program incorporated into the load-calculation circuit 3 and the operation of the load-setting device 1. As illustrated in FIG. 2, when the load-setting device 1 is switched on and started (block 1), the preset load conditions which are present in the preset-value generator 2 are sent to the load-signal generator 4.

These given conditions are stored in the load-signal generator 4, and at the same time are produced on its output as load signals (block 2). In the block designated 3, the $F_1$ and $F_2$ registers are set to 1. As slipping and sliding conditions have not yet occurred (block 4), the operation proceeds to block 11. Register $F_1$ is set at 1 (the setting is completed during the start time). Because in block 12, $F_2$ is set to 1, the operation proceeds to block 13.

On the basis of such power-running and/or such braking command (hereinafter simply referred to as "such command") received from such train operator on the basis of the output of the aforementioned load signal, the railroad car will accelerate or decelerate, and the actual acceleration or deceleration which corresponds to this period of time will be communicated to the load-calculation circuit 3 as such acceleration and deceleration signal B.

The load-calculation circuit 3 performs the calculation $C=|A-B|$. The value of C so obtained is compared with preliminary determined value $\alpha$ (block 14). If the value of C is greater than $\alpha$, a judgment is made that such acceleration and deceleration signal B of such railroad car differs from such command A received from such train operator to the extent that the speed of such railway car needs to be corrected. The load signal must be corrected with an A/B coefficient (where signal B is not equal to 0, block 15). In blocks 16 through 18, empty-car verification [cross-checking] of the load signal is performed. In block 19, the registers F2 and F3 are set to 0.

The following explanations concern the above-mentioned empty-car verification. More specifically, once the full cycle of blocks 4, 11, 12, 20, and 21 has been repeated for the appropriate number of times ($\gamma$), in block 22, register $F_2$ is set to 1. As a result, the compensation of the above-mentioned load signal occurs at each time interval T. A construction of the type in which the load signal is to be corrected as a matter of course is inconvenient, because time is needed for the acceleration or deceleration of such railway car to be changed under the effect of the load signal, once it has been corrected. Such a correction of the load signal continues until signal A and acceleration and deceleration signal B coincide. Once signal A and acceleration and deceleration signal B of such railroad car coincide, the load-setting device 1 will continue to operate as a conventional load-setting device.

When railroad cars are combined to form a train consist, a correction-comparison of such railway car's acceleration and deceleration command A with command B is based on the assumption that the number of passengers in all cars is the same. Therefore, such railroad cars carrying fewer passengers will require the running power or braking force to be greater than that which is actually being developed. If, in this case, such command which is received from such train operator is of an extremely strong nature, it will be required that the braking force and the power-running force exceed the force of adhesion (i.e., traction) between the rails and the wheels of such train consist, whereby slippage of such wheels will take place. Thus, for those railroad cars which are exhibiting slippage, it will be required that the load signal be reduced by a certain predetermined amount β and that the signal approach as closely as possible the actual load signal.

The process now returns to block 4. When such wheels begin to slip the speed of their rotation is increased; when sliding occurs, such wheels are stopped. Thus, when such action is detected by such detection signal generator 8, and slip-sliding detection signal 54 which is shown in FIG. 1 is sent to the load calculation circuit 3, the operation proceeds to block 5. Furthermore, because register $F_1$ is set to 1, the operation proceeds to block 6, and the predetermined amount β is subtracted from the load signal.

In the next block 7, the register F1 is set at 0 and in blocks 8–10, the empty-car verification [cross-checking] of the load signal takes place. As a result of the above-described correction of the load signal, the power-running or braking force is weakened, and the wheels once again recover traction. The operation again returns to block 4 and if the slip-sliding is continued the operation proceeds to block 5. Because, however, $F_1$ has been maintained at 0, the above mentioned adjustment of the previously cited load signal continues.

In particular, each time slippage develops, correction of the load signal which was produced under the effect of the above slip-sliding takes place. As a result, when slip-sliding is discontinued, the operation proceeds from block 4 to block 11. Register $F_1$ is set to 1, and thus it becomes possible to correct the load signal which is affected by slip-sliding. In other words, when slip-sliding occurs, such wheels recover traction under the effect of the operation of the slip-sliding detection controller 6. Furthermore, if, thereafter, slip-sliding is repeated, the load signal is once again corrected in block 6.

The above mentioned correction coefficient β may be determined according to various criteria. For example, it can be defined as $$\beta=(\text{weight of loaded car}-\text{weight of empty car})/D,$$

where D is set as a fraction defined as the total actual weight of the passengers and/or freight present in the car divided by the total maximum weight of the passengers and/or freight which the car can accommodate (weight being expressed as a whole number in each case).

The following explanation relates to the empty-car weight verification of the load signal. In block 8, a difference L between the load signal and the empty-car load 55 is calculated. In block 9, if L is positive (i.e., if the load signal exceeds empty-car load 55), the calculation is continued. If L is negative (i.e., the load signal is lower than the weight of empty car load 55), the above mentioned empty-car load 55 is used as a load signal (block 10). Thus the lowest value of the load signal is ascertained. The same occurs in blocks 16 to 18.

As conditions may arise when the traction between such rails and such wheels may be extremely low (e.g., because of the presence of rainwater or dirt on such rails), in such cases, even though the load signal in this case may be correct, the existing conditions are favorable for slip-sliding. Under these circumstances, because the load signal is reduced with the loss of traction, in the worst case it becomes possible for the load-signal to fall below the value of the empty-car load.

Thus, it has been shown that the load-setting device 1 generates through the preset-value generator 2 the pseudo-load signal 51 which corresponds to the initial load weight of such railway car. The load-setting device 1 modifies the pseudo-load signal 51 in response to such at least one of such power running command and such brake command signal A and the acceleration and deceleration signal B. Through this modification, the load-calculation unit 58 increases or decreases the pseudo-load signal 51. When such slip-sliding detection signal 54 is input to the load-calculation unit 58, the load-calculation unit 58 further modifies (i.e., decreases by the predetermined amount) the pseudo-load signal 51 in response to such slip-sliding detection signal 54.

Notwithstanding the empty car verification circuit 57 and the high-ranking priority unit 56 which are discussed directly below, the pseudo-load signal 51 as modified is sent to load-signal generator 4 as an initial load signal 52. Load-signal generator 4 memorizes the load condition of the initial load signal 52 and sends it to at least one of such braking control unit 20 and such power-running control unit 21 as the load signal 16. The load signal 16 essentially represents the actual load weight exerted on such railway car.

If necessary, the device may be equipped with the empty-car verification circuit 57. The empty-car verification circuit 57 generates and communicates an electrical signal representative of a weight of such railway car when empty. The high-ranking priority unit 56 is connected to receive the load signal from the load-calculation unit 58 and the empty weight railway car signal from the empty car verification circuit 57. The high-ranking priority unit 56 compares the load signal with the empty weight railway car signal. Most importantly, the high-ranking priority unit 56 communicates as an output one of the load weight and the empty weight signals as the initial load signal 52. This ensures that the load signal 16 represents a weight of such railway car that generally exceeds the weight of such railway car when empty.

The load-signal generator 4 communicates the initial load signal 52 received from the high-ranking priority unit 56 as the actual load signal 16. The load signal 16 is usable by such at least one of such brake control unit 20 and such power-running control unit 21 to improve riding characteristics of such railway car. The load signal 16 essentially represents the actual load weight exerted on such railway car.

The empty-car verification circuit 57 and the high-ranking priority unit 56 thus prevent "decrease" of the load signal 16 below the point where it represents a load lighter than the load of an empty railway car. This means that, as in the case of such conventional load-compensation device, the instant invention may be set to correct load conditions even without the use of such pneumatic spring pressure.

The above example was explained with reference to such railroad car equipped with a device for detecting sliding conditions and for stopping the car. The present invention, however, is not limited to the embodiment described above, and in the case that such railway car cannot be equipped with the sliding detection and stopping device, the invention may be realized for each railway car in the form of four speed-sensors 9 (one for each wheel) and such slip-sliding detection controller 6 (i.e., such detection signal generator 8 and such acceleration/deceleration calculation circuit 7).

Without the use of such conventional load-compensation device, yet in a manner analogous to that of systems equipped with load-compensation devices, the instant device is able to control the acceleration and/or deceleration of the railroad car on the basis of a command. As, according to the present invention, the power running and braking commands are the same as those used with conventional railway cars and systems, the present system is fully compatible with existing railway cars.

It can be seen from the above description that the problems of the prior art devices are solved by employing the unique load-setting device of the instant invention which is preferably used on railway cars. The instant device 1 is installed on each such railway car and operates in such a manner that it sends an output signal to at least one of a power-running control unit 21 and a brake control unit 20. This output signal is sent in the form of a load signal corresponding to each of the actual loads on the respective railway cars of such train consist.

It will be further appreciated that the load-setting device of the present invention is designed to be used in railway cars in which it performs a comparison, by means of its load-calculation circuit 3 between the pseudo-load signal of the respective car (which is preset in a preset-value generator) with such railway car's actual acceleration or deceleration, known on the basis of the power-running command and/or the brake command, and the railway car speed signal.

The above pseudo-load signal is then increased or decreased accordingly, and the load-signal appears on the output of the device. For each railway car in such train, the load signal must correspond to the weight of passengers and/or freight riding therein. The preset load signal, however, establishes conditions which are the same for all railway cars in such train, and the increase and decrease (of the signal's values) will also be the same for all such railway cars. As a result, those railway cars in which the weight of passengers and/or freight is less than that represented by the preset conditions will have more favorable conditions for slipping and sliding than other cars.

Therefore, for those railway cars which are more vulnerable to sliding and slipping, the pseudo-load signals will be reduced on the basis of the slip-sliding detection signals, whereby the load conditions in each railway car will be optimized in compliance with the weight of passengers and/or freight actually occupying such railway car.

If the instant device is equipped with the empty-car verification circuit 57 operating so that the above-mentioned load signals are each guaranteed to represent weight which exceeds that of an empty railway car, even when such brake command and/or such power-running command received from such train operator reflect a reaction to slipping or sliding, the pseudo-load signal will be only reduced to a certain extent. Simply put, the empty-car verification circuit and the high-ranking priority unit of the instant device prevent the resulting diminished load signal from representing a weight lighter than the load of an empty railway car.

While the presently preferred embodiment and additional alternative embodiments for carrying out the instant invention have been set forth in detail in accordance with the Patent Act, those persons skilled in the load-compensation mechanism art to which this invention pertains will recognize various alternative ways of practicing the invention without departing from the spirit and scope of the appended claims.

I claim:

1. An improved railway car load-setting device disposed on a railway car for determining an actual load weight being exerted on such railway car and communicating an electrical signal value, which is representative of such actual load weight on such railway car, to at least one of a brake control unit and a power-running control unit, said improved railway car load-setting device comprising:

(a) a preset-value generator means disposed on such railway car for communicating, as an output, a pseudo-load weight electrical signal value representative of and corresponding to a preset initial load weight of such railway car;

(b) a load-calculation circuit means disposed on such railway car for generating and communicating a load weight electrical signal value, said load-calculation circuit means including:

(i) a load-calculation unit connected to receive at a fourth input thereto said pseudo-load weight electrical signal value from said preset-value generator means and connected to receive at a first input thereto a brake command electrical signal value from a brake command communication line and connected to receive at a second input thereto an electrical signal value representative of both acceleration and deceleration of such railway car and connected to receive at a third input thereto an electrical signal value representative of a slip-sliding condition, (ii) an empty car verification circuit for generating and communicating an electrical signal value representative of a weight of such railway car when empty, and (iii) a high-ranking priority unit, having a first input connected to receive said load weight electrical signal value output from said load-calculation unit and a second input connected to receive said empty weight railway car electrical signal value from said empty car verification circuit, for comparing said load weight electrical signal with said empty weight railway car electrical signal and communicating as an output one of said load weight and said empty weight electrical signals as said load weight electrical signal so as to ensure that said load weight electrical signal represents a weight of such railway car that generally exceeds such weight of such railway car when empty; and (c) a load-signal generator means connected to receive said load weight electrical signal value from said high-ranking priority unit;

wherein (i) said load calculation unit modifies said pseudo-load weight electrical signal in response to said electrical signals received at said first, second and third inputs thereto and generates therefrom for output to said high-ranking priority unit said load weight electrical signal which more accurately represents such load exerted on such railway car and (ii) said load-signal generator means communicates said load weight electrical signal received from said high-ranking priority unit as said actual load weight electrical signal which is usable by such at least one of such brake control unit and such power-running control unit to improve riding characteristics of such railway car.

2. The improved railway car load-setting device, according to claim 1, wherein said actual load weight electrical signal value is communicated to such brake control unit.

3. The improved railway car load-setting device, according to claim 1, wherein said actual load weight electrical signal value is communicated to such power-running control unit.

4. The improved railway car load-setting device, according to claim 1, wherein said load-calculation unit further includes a fifth input connected to receive a power-running command electrical signal indicative of propulsion of such railway car, wherein said load calculation unit modifies said pseudo-load weight electrical signal in response to said electrical signals received at said first, second, third and fifth inputs thereto and generates therefrom said load weight electrical signal for output to said high-ranking priority unit.

5. The improved railway car load-setting device, according to claim 4, wherein said load-setting device further includes a delay circuit for delaying at least one of said brake command electrical signal and said power-running command electrical signal in time so as to assure that at least one of said brake command electrical signal and said power-running command electrical signal and said acceleration and deceleration electrical signal are received approximately matched in time at said first, fifth and second inputs, respectively, of said load calculation unit.

6. The improved railway car load-setting device, according to claim 1, wherein said acceleration and deceleration electrical signal is indicative of at least one of a value of and variations of a speed of such railway car derived from a speed sensor disposed on such railway car adjacent a wheel of such railway car.

7. An apparatus for generating and communicating an electrical signal value representative of an actual load weight of a railway vehicle to at least one of a brake control unit and a power-running control unit disposed on such railway vehicle, said apparatus comprising:

(a) a load calculation unit for generating and communicating a load weight electrical signal;

(b) a first means for communicating a brake command electrical signal value to a first input disposed on said load calculation unit, said brake command electrical signal being indicative of a command to operate brakes on such railway vehicle;

(c) a second means for communicating an acceleration and deceleration electrical signal value to a second input disposed on said load calculation unit, said acceleration and deceleration electrical signal being indicative of at least one of a value of and variations of a speed of such railway vehicle;

(d) a third means for communicating a slip-sliding detection electrical signal value to a third input disposed on said load calculation unit, said slip-sliding detection electrical signal being indicative of at least one of a slip of a wheel wherein a rotational speed of such wheel increases relative to movement of such railway vehicle and a slide of such wheel wherein such rotational speed of such wheel decreases approximately to zero relative to movement of such railway vehicle;

(e) a preset-value generator means for communicating a pseudo-load weight electrical signal, representative of a preset initial load weight of such railway vehicle, to a fourth input disposed on said load calculation unit;

(f) a fourth means for communicating a power running command electrical signal to a fifth input disposed on said load calculation unit, said power running command electrical signal being indicative of propulsion of such railway vehicle; and (g) a load signal generator means connected at an input thereto to receive said load weight electrical signal value from said load calculation unit;

wherein (i) said load calculation unit modifies said pseudo-load weight electrical signal in response to said electrical signals received at said first, second, third and fifth inputs and generates therefrom said load weight electrical signal which more accurately represents such load exerted on such railway vehicle and (ii) said load signal generator means communicates said load weight electrical signal as said actual load weight electrical signal which is usable by such at least one of such brake control unit and such power-running control unit to improve riding characteristics of such railway vehicle.

8. The apparatus for generating and communicating said actual load weight electrical signal, according to claim 7, wherein said modification of said pseudo-load weight electrical signal by said load calculation unit in response to said electrical signals received at said first, second, third and fifth inputs involves:

(a) one of increasing and decreasing said pseudo-load weight signal in response to a comparison between said at least one of said brake command electrical signal and said power running command electrical signal with said acceleration and deceleration electrical signal; and (b) decreasing said pseudo-load weight electrical signal in response to said slip-sliding detection electrical signal.

9. The apparatus for generating and communicating said actual load weight electrical signal, according to claim 7, wherein said preset-value generator means has memory for storing a plurality of load weight values representative of said preset initial load weights of such railway vehicle.

10. The apparatus for generating and communicating said actual load weight electrical signal, according to claim 9, wherein said apparatus further includes:

(a) an empty car verification circuit for generating and communicating an electrical signal value representative of a weight of such railway vehicle when empty; and (b) a high-ranking priority unit, connected between said load calculation unit and said load signal generator means, having a first input connected to receive said load weight electrical signal from said load calculation unit and a second input connected to receive said empty weight railway vehicle electrical signal value from said empty car verification circuit;

wherein said high-ranking priority unit compares said load weight electrical signal with said empty weight railway vehicle electrical signal and communicates one of said load weight and said empty weight electrical signals as said load weight electrical signal to said load signal generator means so as to ensure that said load weight electrical signal represents a weight of such railway vehicle that generally exceeds such weight of such railway vehicle when empty.

11. The apparatus for generating and communicating said actual load weight electrical signal, according to claim 10, wherein said apparatus further includes a delay circuit for delaying at least one of said brake command electrical signal and said power running command electrical signal in time so that said at least one of said brake command electrical signal and said power running command electrical signal and said acceleration and deceleration electrical signal are received approximately matched in time at said first, fifth, and second inputs, respectively, of said load calculation unit.

12. The apparatus for generating and communicating said actual load weight electrical signal, according to claim 9, wherein said apparatus further includes a speed sensor disposed on such railway vehicle adjacent a wheel for generating and communicating a railway vehicle speed signal value to an input of said second means wherein said second means at least converts said railway vehicle speed signal value into said acceleration and deceleration electrical signal.

* * * * *

UNITED STATES PATENT AND TRADEMARK OFFICE
CERTIFICATE OF CORRECTION

PATENT NO. : 5,544,057
DATED : August 6, 1996
INVENTOR(S) : Toshiyuki Matsuoka It is certified that error appears in the above-identified patent and that said Letters Patent is hereby corrected as shown below:

Column 1, line 9, after "railway", please insert --car--.
Column 4, line 5, please delete "ill", and insert --in--.
Column 7, line 13, please delete "F1", and insert --$F_1$--.
Column 8, line 66, please delete "power running", and insert --power-running--.
Column 11, line 52, please delete "power running", and insert --power-running--.
Column 12, line 13, please delete "power running", and insert --power-running--.

Column 12, line 47, please delete "power running", and insert --power-running--.
Column 12, line 49, please delete "power running", and insert --power-running--.

Line 16 of Abstract, please delete "power running", and insert --power-running--.

Signed and Sealed this

Tenth Day of February, 1998

*Attest:*

BRUCE LEHMAN

*Attesting Officer*     *Commissioner of Patents and Trademarks*